(12) United States Patent  
Fujisawa et al.

(10) Patent No.: US 9,095,778 B2  
(45) Date of Patent: Aug. 4, 2015

(54) PARTY CHAT SYSTEM, PROGRAM FOR PARTY CHAT SYSTEM AND INFORMATION RECORDING MEDIUM

(75) Inventors: Jin Fujisawa, Tokyo (JP); Ryo Yamaguchi, Tokyo (JP); Kyoko Yamazaki, Tokyo (JP); Akira Nishimura, Tokyo (JP)

(73) Assignee: KABUSHIKI KAISHA SQUARE ENIX, Tokyo (JP)

(*) Notice: Subject to any disclaimer, the term of this patent is extended or adjusted under 35 U.S.C. 154(b) by 55 days.

(21) Appl. No.: 13/276,755

(22) Filed: Oct. 19, 2011

(65) Prior Publication Data

US 2012/0110479 A1    May 3, 2012

(30) Foreign Application Priority Data

Oct. 28, 2010  (JP) ................................ 2010-241733

(51) Int. Cl.
*G06F 3/00*      (2006.01)
*A63F 13/30*    (2014.01)

(52) U.S. Cl.
CPC ........... *A63F 13/12* (2013.01); *A63F 2300/306* (2013.01); *A63F 2300/5553* (2013.01); *A63F 2300/572* (2013.01)

(58) Field of Classification Search
CPC .... A63F 13/12; G06F 3/04815; H04L 12/581
USPC ............... 463/32, 42; 715/751, 753, 757, 758
See application file for complete search history.

(56) References Cited

U.S. PATENT DOCUMENTS

| | | | |
|---|---|---|---|
| 6,772,195 B1* | 8/2004 | Hatlelid et al. | 715/753 |
| 7,115,035 B2* | 10/2006 | Tanaka | 463/42 |
| 7,386,799 B1* | 6/2008 | Clanton et al. | 715/758 |
| 2001/0044725 A1* | 11/2001 | Matsuda et al. | 704/269 |
| 2003/0228909 A1 | 12/2003 | Tanaka et al. | |
| 2007/0288560 A1* | 12/2007 | Bou-Ghannam et al. | 709/204 |
| 2010/0304862 A1* | 12/2010 | Coleman et al. | 463/32 |

FOREIGN PATENT DOCUMENTS

JP    2009-301404    12/2009

OTHER PUBLICATIONS

Loogaroo1, "Review—Final Fantasy III (SNES)", uploaded, Apr. 2, 2010, Youtube, FFIII.pdf, 1 page.*
U.S. Appl. No. 13/276,623 to Jin Fujisawa et al., which was filed on Oct. 19, 2011.

* cited by examiner

*Primary Examiner* — Haoshian Shih
(74) *Attorney, Agent, or Firm* — Greenblum & Bernstein, P.L.C.

(57) ABSTRACT

Facilitating reconstruction of a party after a game over to avoid wasted time required for gathering members of a party. Moreover, a user may quickly reconstruct (gather) a party to improve the real thrill of an on-line game. Accordingly, an on-line game system allows a user of the game to select and display resurrection points of other characters included within the party. Since resurrection points of other characters included within the party can be selected and restored, wasted time required for gathering with each other around one location for the purpose of reconstructing a party can be avoided. Thus, it is possible to quickly gather the party.

13 Claims, 6 Drawing Sheets

PARTY CHAT SYSTEM, PROGRAM FOR PARTY CHAT SYSTEM AND INFORMATION RECORDING MEDIUM

TECHNICAL FIELD

The present invention relates to a party chat system through an information communication network.

BACKGROUND ART

Hitherto, there have been known party chat systems in which players can speak with each other as if characters existing within a virtual space make speech (e.g., Japanese Patent Publication No. 2009-301404). In such party chat systems, game providing servers and a plurality of clients are connected through an information communication network, whereby when text information is inputted to an input part (e.g., keyboard) of a certain client, that text information is also displayed on a display part of any other client.

As a conventional chat system, there is known, as shown in FIG. 6, such a chat system to display a balloon 101 on a head part of a character manipulated by player so that text information inputted by player is displayed within the balloon 101. Thus, player can discriminate what character is manipulated and what statement is inputted and transmitted.

Moreover, as another conventional chat system, there is shown a chat system in which there is provided a window 102 where conversation between players is displayed as a list within a display screen as shown in FIG. 7 so that text information inputted by player is displayed within the display screen. In such cases that a window 102 is displayed within the display screen, character name (or player name) and text information inputted with respect to that character are displayed within the window 102 in order to identify a player that player has inputted text information.

PRIOR ART REFERENCE

Patent Reference

[Patent reference 1] Japanese Patent Publication No. 2009-301404

SUMMARY OF THE INVENTION

Problems to be Solved

However, in the case where a balloon 101 in which text information is included is assumed to be displayed on a head part of a character manipulated by player as shown in FIG. 6, player can read only text information which has been inputted with respect to a character existing within the own display. A plurality of clients is connected through an Internet to a server providing the so-called on-line game, and players exist with respect to clients. In general, own character that a concerned player manipulates is mainly depicted on display screens of the clients. Only in the case where other characters manipulated by other players exist within the depicting range near own character within a virtual space, those characters are displayed on the display screen of the client. Accordingly, even in the case where own character and any other character play together, when any other character does not exist near the own character, but exists outside the depicting range, there was the problem that player who manipulates own character fails to recognize statement of a player who manipulates other character.

Moreover, in such a case that a window 102 where conversation between players is displayed as a list within a display screen as shown in FIG. 7, only the name of a person who makes statement and the content of statement are associated with each other within the window 102. For this reason, information that player of game can collect at a time was extremely small. Further, since the window 102 is displayed on a display screen in a manner different from a virtual space where characters act, player must move line of sight from a virtual space where characters act toward the window 102 every time any other player speaks. As described above, since waving width of movement of line of sight of player is large, the fact as described above would obstruct operability of game. Further, since a character and statement of the character are displayed within regions entirely different from each other, there was the problem that such reality that character itself speak cannot be provided.

The present invention has been made for the purpose of solving the problems of the above-described conventional chat systems, and its object is to provide a chat system capable of reasonably displaying text information required for player without damaging operability of game and in a form having reality.

In concrete terms, an object of the present invention is to provide a chat system adapted so that there is no possibility that there may no failure to recognize character inputted with respect to a character even in the case where any character does not exist within a display screen, and adapted for displaying, within the same region, a virtual space where characters act and statements inputted by player to thereby reduce movement of line of sight of player thus to have ability to maintain such a reality that the character itself speak.

Means for Solving the Problem

In the present invention, there is employed a scheme to essentially display, on a predetermined position of a display screen, character information of character included within a certain party to display statement inputted with respect to the character in a manner adjacent to the character information. Thus, the present invention can suitably display character information within the party for which player requires and statement inputted with respect to character within the party in a form such that the operability of game is not damaged and in a form having reality.

A first aspect of the present invention relates to a chat system using a computer adapted for displaying, on a display part, text information inputted by means of an input part with respect to characters existing within a virtual space to thereby enable conversation using text between players through information communication network.

The chat system according to the present invention includes a party storage part, a character information display part, and a text information display part.

The party storage part is adapted for storing there within party information relating to a party in which a plurality of characters is included. The party referred to here means group of characters. The parry information are stored in the party storage part in a manner such that one or a plurality of characters ID is or are associated with each other.

The character information display part is operative to display character information of respective characters included within the party in accordance with party information stored in the party storage part. As character information referred to as here, there are included, e.g. icon of character, face image of character, weapon that character uses, name and other kinds of parameters.

The text information display part is operative to display, on a display part, text information inputted with respect to character in a manner adjacent to character information of respective characters displayed by the character information display part.

By employing such a configuration, the present invention can provide a chat system which can suitably display text information for which player requires in such a form that the operability of game is not damaged and in a form having reality.

In on-line chat games, information is generally information relating to own information, information relating to other character that any other player plays a game along with own player, and information of other player. In the present invention, character information included within a party and inputted statement of character are displayed at predetermined parts of the display part. For this reason, even in the case where character included within the party does not exist in the vicinity of own character, there is no possibility that there is no failure to overlook its statement. Moreover, in accordance with the present invention, since the virtual space in which character acts and statement of player are displayed within the same region, the distance of movement of line of sight of player is shortened. Accordingly, the operability of game is improved. Further, in accordance with the present invention, it is possible to make a performance having such a reality as if character itself speaks. In addition, in the state where the character is active, e.g., in the state where event movie, etc. is executed, balloon chat was conventionally not performed. However, in accordance with the present invention, character information is displayed so that balloon chat can be performed.

It is preferable that at least icon information of character is included in the character information in the present invention. As an example of the icon image, there are face image of character, image of weapon that character uses, and images which are set by user of another game.

For example, if statement of character is displayed in a manner adjacent to face image of character, such a reality as if the character itself speaks can be enhanced to more degree.

It is preferable that the chat system according to the present invention includes a display time control part for controlling time period during which character information displayed by character information display part and text information displayed by text information display part are displayed on the display part.

For example, in the case where display time is controlled so that text information is displayed on a display part only for a predetermined time period after such information is inputted to client so that text information is not inputted, text information disappears from onto the display screen. For this reason, operability of game can be enhanced to more degree.

It is preferable that the character information display part according to the present invention is operative to grasp a position where respective characters including party exist within virtual space to display, on the display part, character information in accordance with the arrangement corresponding to a position where the character exits.

By employing such configuration, the invention can determine at a glance, e.g., what character exists at a position nearest to the own character. Moreover, since statement of character near the own character is displayed near the own character, presence of the game is improved.

Moreover, the second aspect of the present invention relates to a program for a chat system, which is adapted for allowing a display part to display text information inputted by an input part with respect to characters existing within a virtual space to thereby permit conversation using text between players through an information communication network.

The program for chat system according to the present invention serves to allow a computer to operate as party storage means, character information display means and text display means.

Specifically, the party storage means is means for storing party information relating to a party in which a plurality of characters are included.

The character information display means is means for displaying, at a predetermined position of the display part, character information of respective characters included in the party in accordance with party information stored by the party storage means.

The text display means is means for displaying, on the display part, text information inputted with respect to respective characters displayed by the character information display means in a manner adjacent to character information thereof.

Further, the third aspect of present invention is directed to a computer readable information recording medium in which the program for chat system according to the second aspect of present invention is stored.

Technical Effect of the Invention

By employing such a configuration, the present invention can properly display text information for which player requires without damaging the operability of the game and in a manner having reality.

BEST MODE FOR CARRYING OUT THE INVENTION

Preferred embodiments according to the Invention will now be described. It should be noted that the present invention is not limited to embodiments described below. The present invention includes a scope within which modifications/changes are made as occasion demands within the scope within which the person skilled in the art is self-explanatory.

Figure 1:
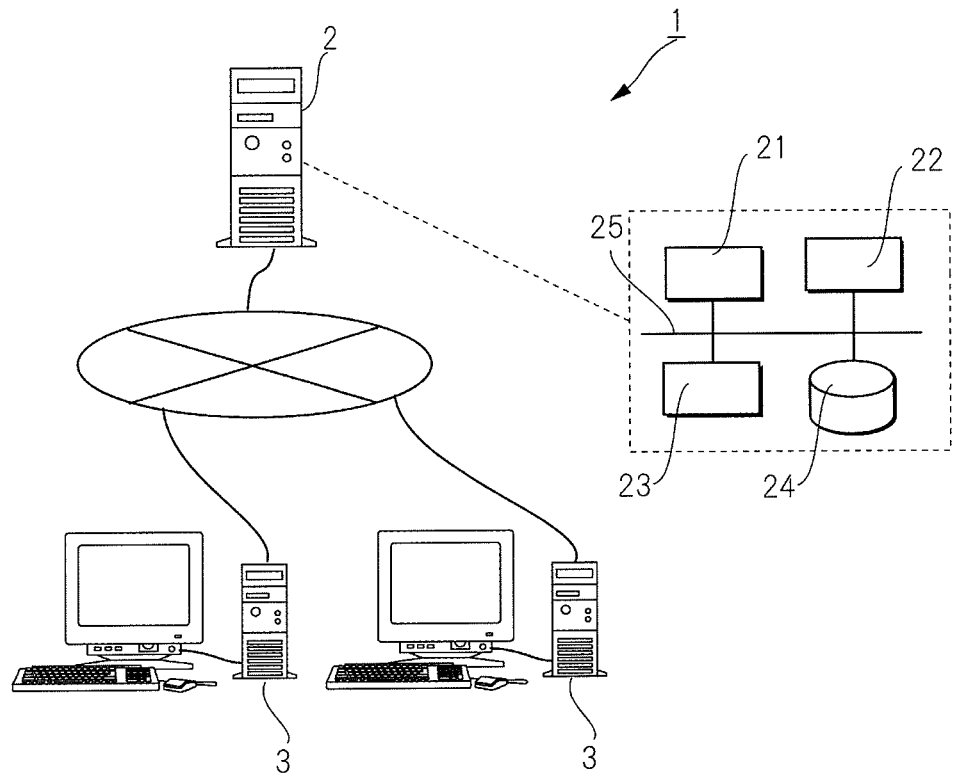
FIG. 1 is a block diagram of a chat system according to the present invention.

FIG. 1 is a block diagram of a system for explaining a chat system 1 according to the present invention. As shown in FIG. 1, the system of the present invention includes a server 2 and clients 3. The server 2 is connected to a plurality of clients 3 through communication network such as Internet, etc. The server 2 is a game providing server, and performs download or streaming distribution of game program with respect to the clients 3 through the communication network. In the client 3, there are stored programs for performing download and/or streaming distribution of game programs from the server 3. There may exist a plurality of servers 2.

As shown in FIG. 1, the server 2 includes an input/output 1 part 21, a control part 22, an arithmetic processing part 23 and a storage part 24, wherein these components are connected by way of a bus 25 so that transmission/reception of information can be performed. In this embodiment, for example, the work area of the control part 22 of the server, the arithmetic processing part 23 and the storage part 24 function as the party storage part 11, the character information display part 12, the test information display part 13 and the display time control part 14. Namely, when predetermined information is inputted from the input/output part 11, the control part 22 serves to read out control program stored in the main memory of the storage part 14.

Figure 2:
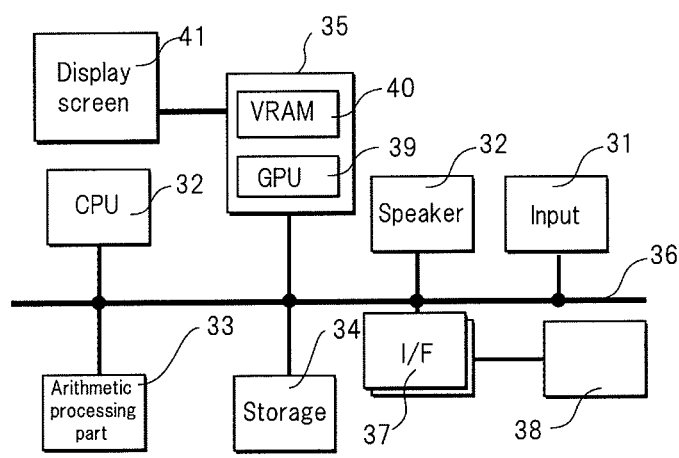
FIG. 2 is a block diagram showing a hard configuration of a client in the present invention.

FIG. 2 is a block diagram showing an example of the hardware configuration of the client 3. The client 3 includes an input part 31, a CPU 32, an arithmetic processing part 33, a storage part 34 and an image processing block 35. Further, respective components are connected so that transmission/reception of information can be performed by a bus 36. Further, this chat system is connected to an interface (I/F) 37 through the bus 36. For this reason, e.g., this chat system can be connected to an information recording medium 38 in which programs are stored. The programs stored in information recording medium 38 serve to allow computer or image processing part to function as a predetermined means. In addition, these programs serve to allow computer or image processing part to execute predetermined steps. It is to be noted that memory connected through the I/F interface 37 may function as the entirety or a part of the storage part 24.

The image processing block 35 includes a graphic processing unit (GPU) 39 and a video RAM (VRAM) 40. Further, the GPU 39 and the video RAM (VRAM) 40 are connected in order to permit transmission/reception of information. In FIG. 2, reference numeral 41 designates a display part (monitor), and reference numeral 42 designates a speaker.

In this embodiment, for example, the CPU 32, the arithmetic processing part 33, the work area of the storage part 34, and the program for game stored in the information recording medium 38 of the client function as the party storage unit 11, the character information display part 12, the text information display part 13 and the display time control part 14. In the case where operating information is inputted from the input part 31, the operating information is transmitted from the input part 31 through the bus 36. Thus, the CPU serves to read out program stored in the information recording medium 28 to perform a predetermined processing. The CPU 32 serves to read out various information stored in the storage part 34 and the information recording part 38 in accordance with command from the information recording medium to perform a predetermined arithmetic processing at the arithmetic processing part 33. The CPU 32 serves to store computational result into storage part 34 to output suitable information from the speaker 41 and the speaker 42 using the computational result.

Figure 3:
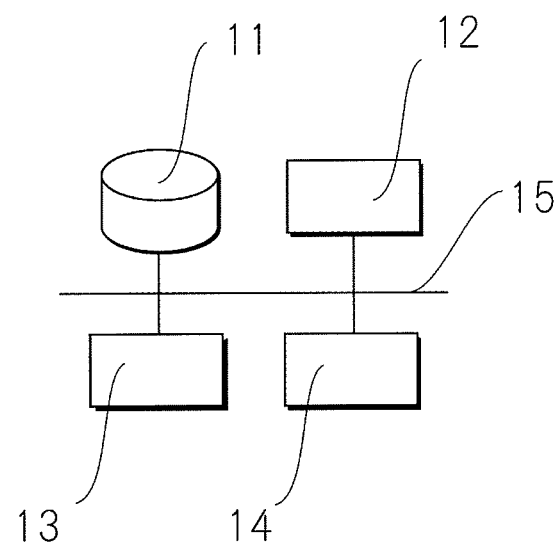
FIG. 3 is a block diagram of the chat system according to the present invention.

FIG. 3 is a block diagram showing a chat system according to the present invention. This chat system according to the present invention is directed to a chat system using computer serves to display, on display parts of respective clients, text information inputted by input parts of the clients with respect to characters existing within virtual space of the game to permit conversation using text between players of the game. The chat system according to the present invention includes a party storage part 11, a character information recording part 12, a text information display part 13, and a display control part 14. These components are connected so that transmission/reception of information can be performed through the bus 15. It is to be noted that the operations of these components may be attained by either the server 2 or the clients 3 constituting the chat system.

The party storage part 11 is adapted so that there are stored party information relating to party in which a plurality of characters are included. The characters are displayed on a monitor of the client 3 generated by the image processing part. The characters are inputted by input parts of respective clients, and act within a virtual space of the chat game. Moreover, the party means group or faction including characters, and player who manipulates character can arbitrarily collect other characters to constitute a party. It is to be noted that single character may be constituted by single party in the computer processing. Moreover, the number of characters constituting the party may be varied as occasion demands in accordance with development of the game as occasion demands. The party information are stored in the party storage part 11 in such a manner that one or plural characters IDs or player IDs are associated therewith.

The party chat system according to the present invention may include a storage part for storing characters IDs or player IDs in addition thereto. In general chat system, a plurality of ID information may be stored. In the case of the chat system related to the member's system web site, member's No. may be used as ID information. Moreover, e.g., ID information assigned in order of joining of member may be used. In this case, in general, a part of data base of the card functions as ID information storage part. Further, in the case where the chat system is the card game system and utilizes private card, there may be used ID information assigned to a card indicating characters IDs or player IDs.

The character information display part 12 serves to display, on a predetermined position of the display part, character information of respective characters included within the party in accordance with party information stored in the party information storage part. Namely, at predetermined positions of the monitor of a certain client, there are displayed character information of own character inputted by the client and character information inputted by the client and character information constituting the own character and the party. The character information is displayed within the same region as virtual space of a game displayed on the display part of the client. The character information may be displayed in a manner superimposing on characters or objects existing within a virtual space of the game displayed on the display part of the client. Moreover, the character information may be displayed on a display screen also in the state where the character is not active, e.g., in the case where event movie is being executed. The character information generally indicates parameter of the character of the game, and is referred to by player in accordance with development of the game. Accordingly, the character information are displayed at fixed positions on a predetermined screen such as right and lower end, right and upper end, left and lower end or left and upper part of the display screen so as not to prevent obstruction to operability of the game by player. It is to be noted that character information within the party is to be continued on the display screen of the client as long as any other player continues to play a game even if character of any other player exits on a display screen of a certain client.

Moreover, in character information displayed on a display screen, there are included, e.g., icon of character, face image of character, image of weapon that character uses, name, level, job, hit point, situation of player (whether or not player participates in a game), and various kinds of parameters. Particularly, it is preferable that face image of character as character information. As described later, since text information (statement) is displayed in a manner adjacent to the character information of character, face image of character is displayed, player can make performance as if face image speaks.

Further, the character information recording part 12 serves to grasp position where characters included within a party exist within a virtual space to display character information on a display part by arrangement corresponding to positions where respective characters exist. For example, respective clients serve to grasp the positional relationship within the game space between own character who makes manipulation through corresponding characters and other clients subject to manipulation through corresponding other characters to compute distances between own character and other character thereafter to display to arrange character information of other character to display the information thus provided in order close to the own character. Further, the character information recording part 12 serves to arrange character information in order such that, e.g., characters included within the party becomes close to a predetermined position (e.g., display corresponding to start or goal in accordance with development of the game) within a virtual space to display the character information thus provided.

The text information recording part 12 serves to display, on a display part, text information inputted by the character in a manner adjacent to character information of respective characters displayed by the character information recording part 12. Namely, the text information recording part 12 serves to display text information inputted by the character inputted by input parts (keyboard, etc.) of respective clients on display screens and display screens of other clients connected through Internet.

Particularly, the text information display part 13 serves to display text information inputted by a certain client related to the party among text information inputted to the input part of respective clients in a manner adjacent to the character information. A position at which character information exists may be a position adjacent to the character information. Since the text information is adjacent to character information, any image indicating other information is not displayed between the text information and the character information. Moreover, even in the state where character is not active, e.g., in the state where event movie is executed, the text information display part 13 may serve to display character information in a manner adjacent to the character information. Hitherto, since there is employed a scheme of displaying character information at the head of a character existing within a virtual space, it was impossible to perform balloon chat between users for a time period during which event movie is being reproduced on a display screen. In the present invention, there is employed such a scheme to continue to display character information even during event movie, thereby making it possible to perform balloon chat between users even for a time during which event movie is reproduced.

On the other hand, the text information display part does not serve to display text information inputted to a client which does not related to the party among text information inputted to input parts of respective clients in a manner adjacent to the character information. It is preferable that, in regard to text information inputted with respect to characters included within the party, a position where the concerned character exits within a virtual space is grasped to display the position thus grasped on the head of the character. In this way, the display form of statement inputted with respect to a character included in party and the display form of statement inputted with respect to a character included within party are caused to be different from each other so that player can intuitively collect only necessary information.

The display time controller 14 serves to control time period during which character information displayed on the character information display part 12 and text information displayed on the text information display part 13 are displayed on a display part. The display time controller 14 serves to independently control display time of character information displayed on the character information display part 12 and display time of text information displayed on the text information display part 13. Accordingly, time of character information displayed and time of display time of text information may be the same or are different from each other. Particularly, when text information displayed on the text information display part 13 is being displayed at all times, there is the possibility that operability of the game may be damaged. For this reason, in the case where a predetermined time is passed after text information has been inputted with respect to client, such information disappear from onto display screen. The display time controller 14 is operative so that when text information is inputted to an input part of the client, it starts measurement of a predetermined time by making use of a timer circuit of the server or client. Further, when measurement of a predetermined time is completed, the display time controller 14 serves to instruct the character information display part 12 and the text information display part 13 to stop display of information. The time measured by the display time controller is, e.g., 1 sec. to 60 sec., 1 sec. to 60 sec., 10 sec. to 50 sec., 20 sec. to 40 sec. or 30 sec.

An example of the fundamental operation of the chat system according to the present invention which has been described will now be described. In the chat system according to the present invention, when text information is inputted to the input part 31 of the client 3, the inputted text information is transmitted to the server 2 through Internet, and is temporarily stored into the storage part 24 of the server 2. The client which has received text information serves to acquire party information from the party storage part 11. The server 2 serves to specify, on the basis of the patty information which has been acquired from the party storage part 11, any other client 3 having party relationship with respect to the client 3 to which text information is inputted. Moreover, the server 2 serves to read out text information temporarily stored in the storage part 24 to transmit text information to respective clients 3 having party relationship on the basis of the party information. On respective display screens of respective clients 3, there are displayed character information of characters included in the party by the character information display part 12. Further, the text information transmitted to respective clients 3 by the server 1 is displayed on the text information display part 13 in a manner adjacent to character information displayed on the display screen of the client 3 by the text information display part 13.

Figure 4:
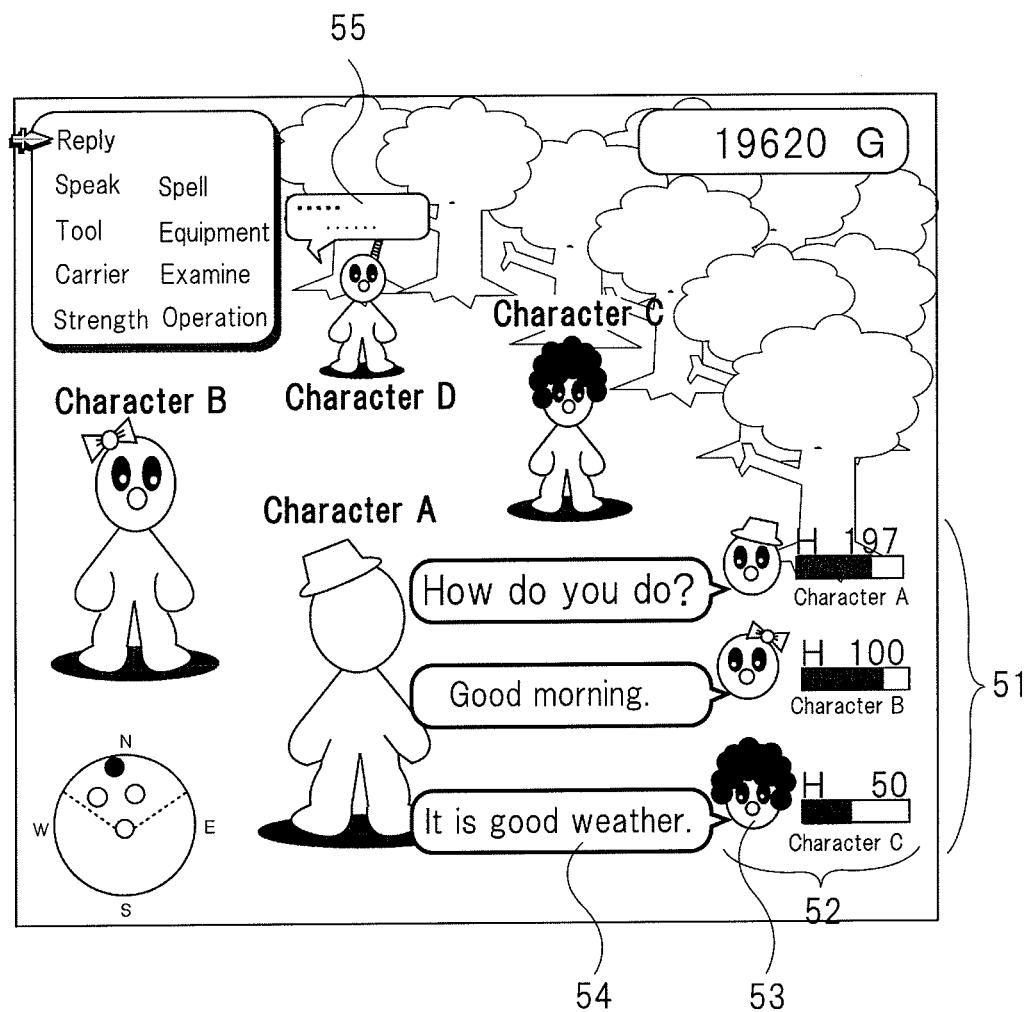
FIG. 4 is an illustration diagram for explaining a first embodiment of a chat system of the present invention.

The first embodiment of the present invention will now be described with reference to the attached drawings. The first embodiment of the present invention is directed to an on-line game in which players can chat with each other through Internet. In this embodiment, as shown in FIG. 4, character (chara B), character (chara C) and character (chara D) are displayed on a monitor which manipulates character (chara A). It is to be noted that, in the on-line game of this embodiment, there is employed a scheme to generate an image of object or character existing within a virtual space projected at line of sight from behind operating character.

In this embodiment, chara A is operating character, and chara A constitutes party 51 together with chara B and chara C. Accordingly, character information 52 of chara A, chara B and chara C at the right and lower part of the display screen. In the character information, there are included face images 53 of chara A, chara B and chara C. On the other hand, since chara D does not constitute party together with chara A serving as operating character, character information of chara D is not displayed on screen.

In this embodiment, character positioned nearest chara A serving as operating character among characters is included in the part chara B. Moreover, character near the chara A serving as operating character next to chara B is chara C. Here, the character information display part 12 serves to grasp the positional relationship within a certain virtual space included in party to display character information at the right and lower end in order such that the distance from the operating character is short. Accordingly, in this embodiment, as character information 52 of the party 51, there are displayed character information of the chara A, character information of the chara B character information of the chara A.

Moreover, pop-up display of text information (statement) 54 inputted to the input part of the client who manipulates respective characters included in the party is performed at a part adjacent to the left of character information. In this embodiment, the statement 54 is inputted to input parts of respective clients, and is then continued to display for 20 sec. Further, setting is made such that when 20 sec. is passed after the statement 54 is inputted; it disappears from onto the display screen. On the other hand, since the chara D is included within the part 51, even in the case where text information is inputted to a client which manipulates the chara D, it is not displayed at the right and lower end of the display screen. In this example, pop-up display of statement 55 inputted with respect to the chara D is performed on the head of the chara D.

Figure 5:
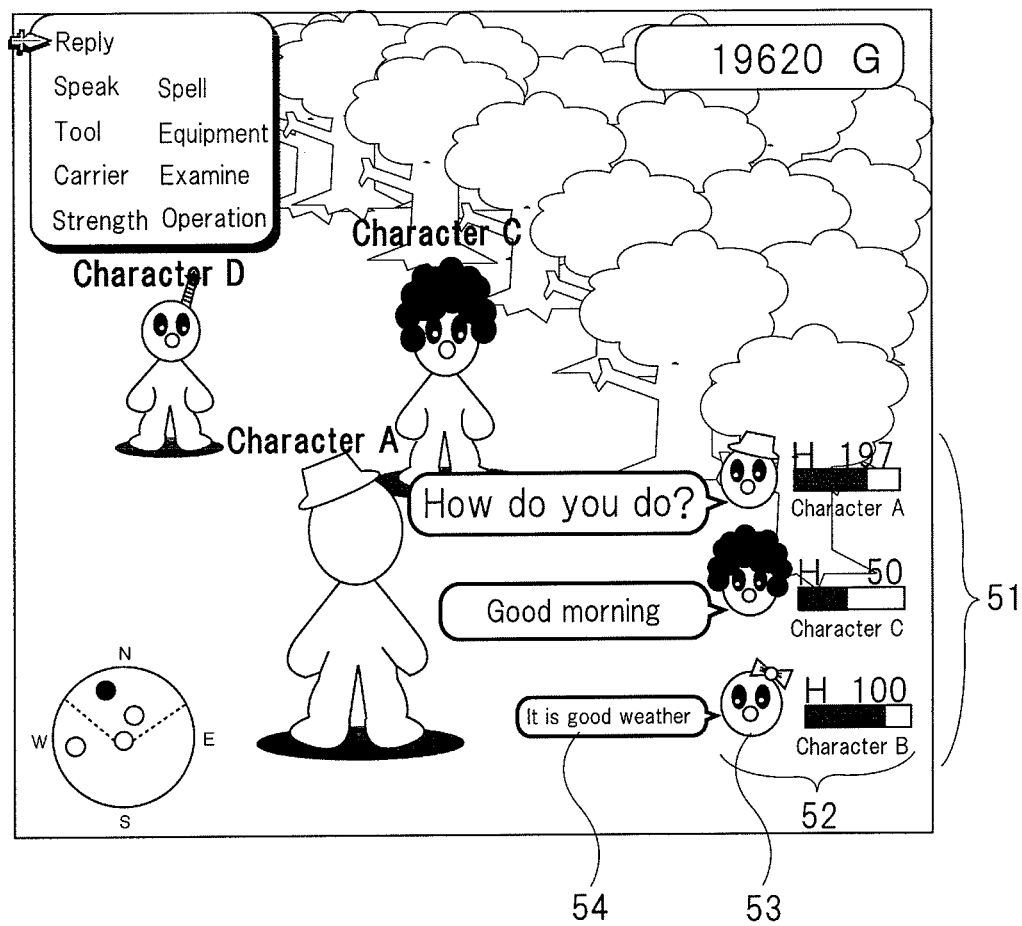
FIG. 5 is an illustration diagram for explaining a second embodiment of a chat system of the present invention.
Figure 6:
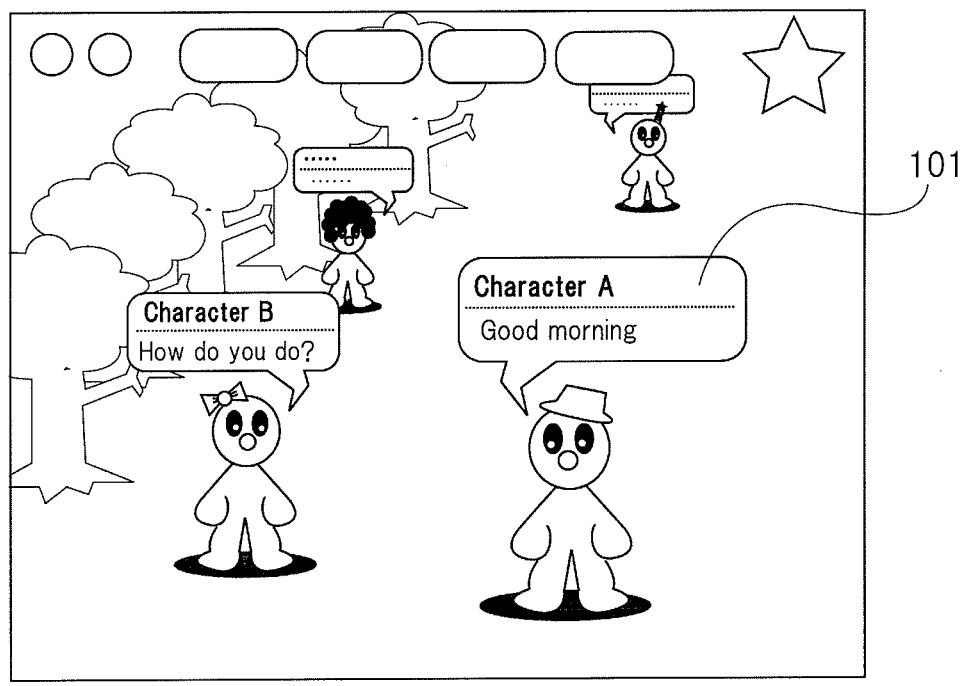
FIG. 6 is an illustration diagram for explaining a conventional chat system.
Figure 7:
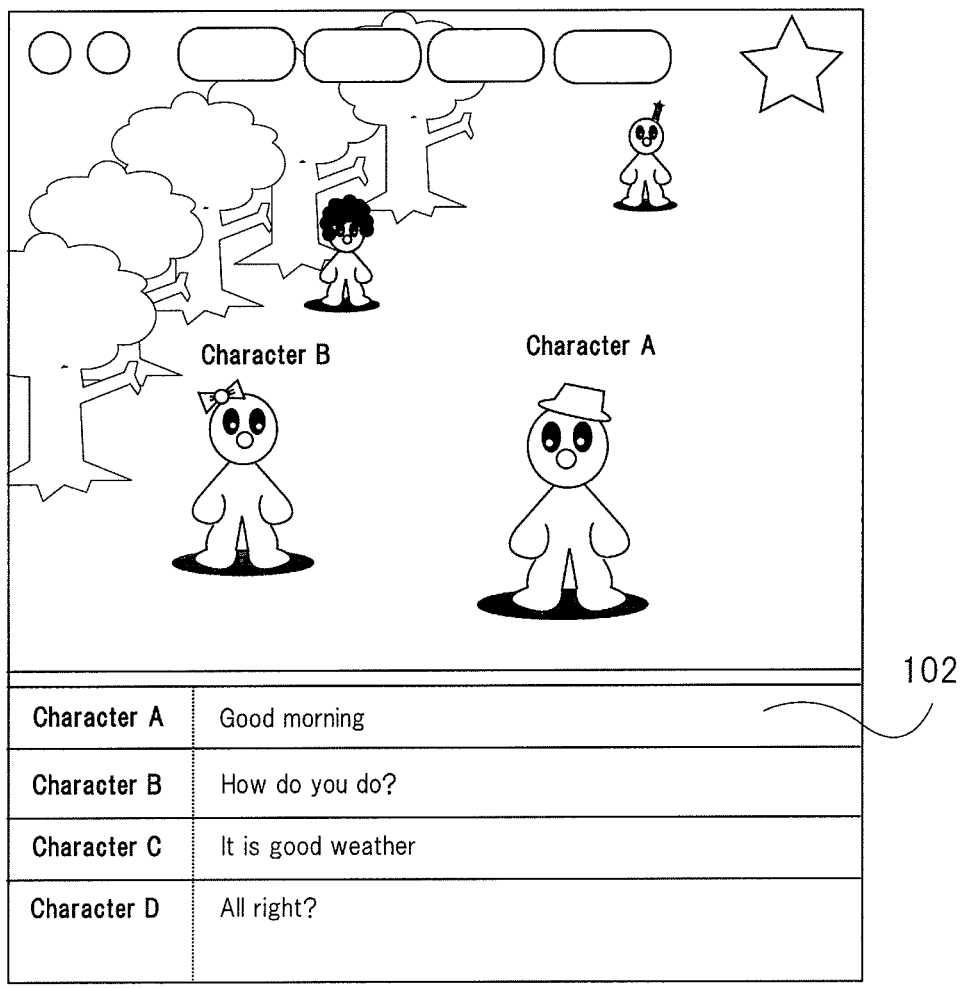
FIG. 7 is an illustration diagram for explaining another conventional chat system.

The second embodiment of the present invention will now be described with reference to FIG. 5. The second embodiment is directed to an on-line game in which players chat with each other through Internet similarly to the first embodiment. Differently from the first embodiment, in the second embodiment, chara B is not displayed on a monitor of a client which manipulates the chara A. It is to be noted that chara B does not only exist within a virtual space projected from the line of sight from behind the chara A, but exists within virtual space of the on-line game. In this embodiment, the chara A, chara B and chara C constitute the party 51. Accordingly, chara B itself is not displayed on a monitor who manipulates the chara A, but if text information is inputted to the client who manipulates the chara B, statement 54 is inputted with respect to the chara B.

Moreover, in the second embodiment, unlike the first embodiment, not only character information is displayed by arrangement corresponding to the position of characters within virtual space within a virtual space, but also size of statement 54 displayed is changed in accordance with the positional relationship of characters within a virtual space. Namely, the text information display part 13 serves to grasp positions within a virtual space of respective characters included in a party to specify distances between the characters thereafter to determine the size of information displayed on the basis of information between respective characters. For example, in the case where, e.g., the distance between characters is away from each other by 20 m within a virtual space, text information is displayed in terms of size of 80% in comparison to ordinary size. In the case where, e.g., the distance between characters is away from each other by 80 m within a virtual space, text information is displayed in terms of size of 20% in comparison to ordinary size. Accordingly, for example, according as the distance between characters included in a party becomes small, text information is displayed at a large size. On the other hand, according as the distance between characters included in a party becomes large, text information is displayed at a small size. In the second embodiment, since the distance between the chara A serving as operating character and the chara C serving as other character is away from each other by 10 m, statement of the chara C is displayed in terms of 90% of ordinary size (size of the chara A). Further, since the distance between the chara A serving as operating character and the chara B serving as other character is away from each other by 40 m, statement of the chara B is displayed on a client of a monitor which manipulates at a size of 60% in comparison to ordinary size. As described above, size of text information is changed in accordance with distances between charters, thus permitting chat game to have a reality such that according as the distance between characters is large, statement becomes more difficult to read. Thus, Interest of the game can be enhanced.

INDUSTRIAL APPLICABILITY

The present invention can be preferably utilized in game industry and software industry.

DESCRIPTION OF REFERENCE NUMERAL

1 Chat system
2 Server
3 Client
11 Party storage part
12 Character information display part
13 Text information display part
14 Display time control part
21 Input/Output part
22 Arithmetic processing part
23 Control part
24 Storage part
25 Bus
31 Input part
32 CPU
33 Arithmetic processing part
34 Storage part
35 Image processing block
36 Bus
37 I/F
38 Information recording display part
39 GPU
40 VRAM
41 Display screen

The invention claimed is:

1. A computer based chat system that enables conversation among players with text through an information communication network by displaying on a display apparatus, text information input by an input corresponding to respective characters, the characters existing within a virtual space, the chat system comprising:

a party storage to store party information, the party including a plurality of the characters;

a character information display to display, at a predetermined position of the display apparatus, character information of each of the plurality of characters included in the party in accordance with party information stored in the party storage; and a text information display to display, on the display apparatus, a first text information input by the character belonging to the party displayed adjacent to the character information of each of the plurality of characters belonging to the party displayed at the predetermined position, when the first text information is input by the character belonging to the party, and to display a second text information input with respect to another character, displayed adjacent to the another character, which does not belong to the party at a position different from the predetermined position.

2. A chat system according to claim 1, wherein the character information comprises icon image of the characters.

3. A chat system according to claim 1, further comprising a display control part to control a time period during which the character information displayed at the character information display and the text information displayed at the text information display are displayed on the display apparatus.

4. A chat system according to claim 1, wherein the character information display is configured to display the character information on the display apparatus in accordance with the positions of the characters.

5. A non-transitory computer readable medium for storing a program for a chat system that enables conversation among players with text through an information communication network by displaying, on a display apparatus, text information input by an input corresponding to respective characters, the characters existing within a virtual space, the program executable by a processor and comprising:

storing party information in a party storage, the party including a plurality of the characters;

displaying in a character display, at a predetermined position of the display apparatus, character information of each of the plurality of characters included in the party in accordance with party information stored in the party storage; and displaying in a text display, on the display apparatus, a first text information input by the character belonging to the party displayed adjacent to the character information of each of the plurality of characters belonging to the party displayed at the predetermined position, when the first text information is input by the character belonging to the party, and to display a second text information input with respect to another character, displayed adjacent to the another character, which does not belong to the party at a position different from the predetermined position.

6. A chat system according to claim 4, wherein the positions of the characters is determined based on a distance between a first of the characters and each of the other characters.

7. A chat system according to claim 6, wherein the displayed character information is arranged in an ascending or descending order according to the determined distance of each of the characters.

8. A chat system according to claim 1, wherein only text information of characters in the party is displayed next to the character information.

9. A chat system according to claim 1, wherein the second text information requires an individual display adjacent to the another character having input the second text information.

10. A chat system according to claim 1, wherein size of the displayed text information changes based on a distance between any two of the plurality of characters.

11. A non-transitory computer readable medium according to claim 5, wherein the another character does not belong to any party.

12. A non-transitory computer readable medium according to claim 5, wherein the second text information requires an individual display adjacent to the another character having input the second text information.

13. A non-transitory computer readable medium according to claim 5, wherein size of the displayed text information changes based on a distance between any two of the plurality of characters.

* * * * *